Figure 1:
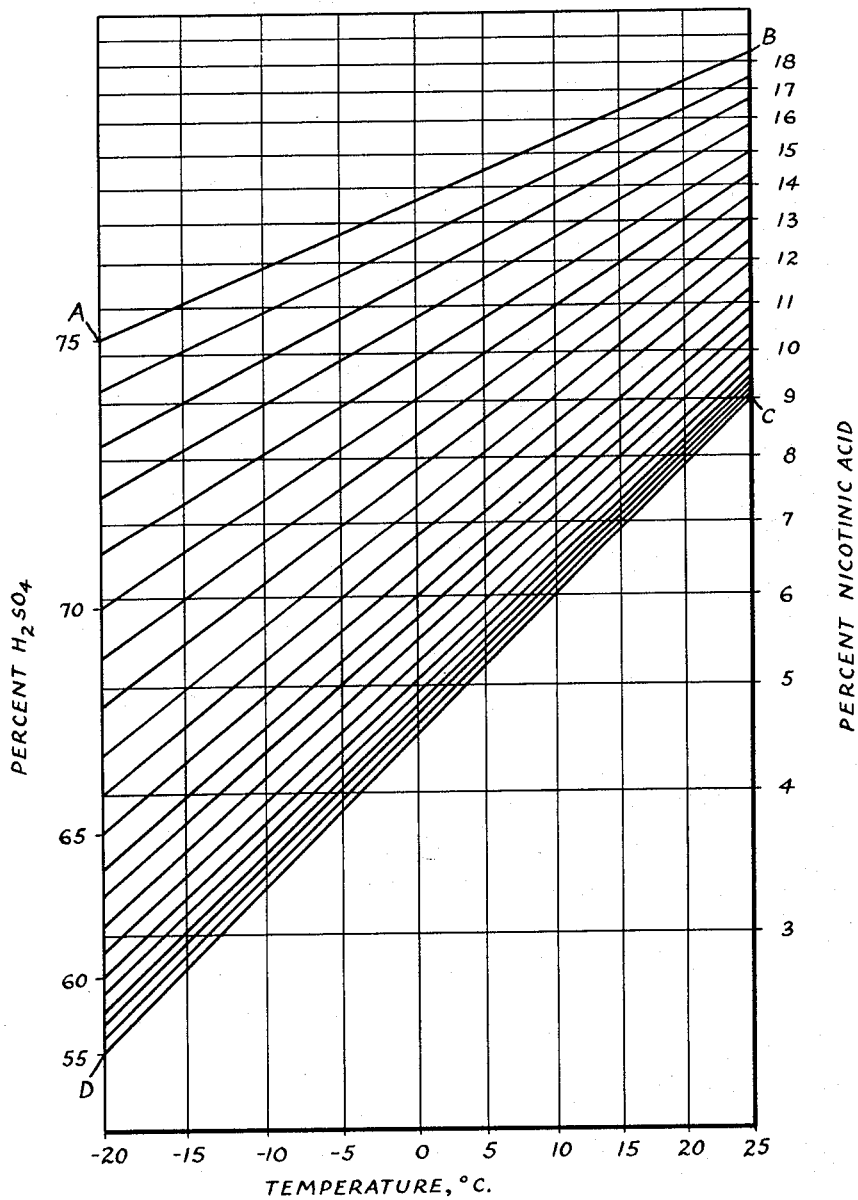

United States Patent Office 2,723,272
Patented Nov. 8, 1955

2,723,272

PROCESS FOR RECOVERING PYRIDINE CARBOXYLIC ACIDS AND SULFURIC ACID FROM MIXTURES THEREOF

Max B. Mueller, Dumont, N. J., assignor to Allied Chemical & Dye Corporation, New York, N. Y., a corporation of New York Application April 24, 1951, Serial No. 222,592

18 Claims. (Cl. 260—295)

This invention relates to a process for recovering pyridine carboxylic acids from solutions thereof in concentrated sulfuric acid and more particularly to the recovery of pyridine carboxylic acids from sulfuric acid-containing oxidation masses in which they are produced, in the form of pyridine carboxylic acid bisulfates, by controlled aqueous dilution of a sulfuric acid-containing oxidation mass.

Pyridine carboxylic acids may advantageously be produced by the oxidation in a sulfuric acid-containing oxidizing medium, of N-heteroaryl compounds containing a single pyridine nucleus and having an oxidizable organic hydrocarbon grouping attached to the pyridine nucleus by one or more carbon-to-carbon linkages. Nicotinic acid, i. e. 3-pyridine carboxylic acid, may be produced from such N-heteroaryl compounds as have an oxidizable hydrocarbon grouping attached to the pyridine nucleus in a single beta or "3" position and not more than two additional oxidizable hydrocarbon substituents attached to the pyridine ring, each of which is in an alpha position, for example quinoline, quinaldine, 3-methyl pyridine, 2,3-dimethyl pyridine, 2,3,6-trimethyl pyridine, 5- and 8-hydroxyquinolines, 5- and 8-nitroquinolines and the like, when oxidized either with sulfuric acid alone or with nitric acid or other oxidizing agents in a sulfuric acid reaction medium, or with a mixed sulfuric acid-nitric acid oxidizing agent in a substantially anhydrous medium, in each case using an excess of sulfuric acid over that required to oxidize the N-heteroaryl compound to nicotinic acid. Isonicotinic acid, i. e. 4-pyridine carboxylic acid is produced, for example, by the oxidation of such compounds having substituents in the "4" position, e. g. 2,4-lutidine, 4-picoline, etc., while cinchomeronic acid is produced from N-heteroaryl compounds having substituents in the 3 and 4 positions, e. g. 3,4-lutidine, isoquinoline, etc.

The products obtained from such oxidations are mixtures of the pyridine carboxylic acid with the excess sulfuric acid over that used and lost in the oxidation process, so that to recover the pyridine carboxylic acid in pure form it is necessary to separate it from the sulfuric acid. If nitric acid is used in the oxidizing medium, it is usually substantially completely eliminated during the oxidation process, either directly in oxidizing the N-heteroaryl compound or by decomposition to nitrogen oxides, so that very little, if any, nitric acid remains in the oxidation mass after completion of the oxidation reaction; consequently the recovery process in this case also is essentially a recovery from concentrated sulfuric acid solutions.

Recovery of pyridine carboxylic acids from concentrated sulfuric acid solutions has been carried out in the past by a number of methods; according to one prior art method, by drowning the oxidation mass in a large excess of water, for example quantities of the order of about 2 to about 3 volumes of water per volume of reaction mass, adding copper oxide or a copper salt to the resulting mass, neutralizing the mass to precipitate copper pyridine carboxylate, recovering the precipitated copper salt as by filtration, decomposing the copper salt with alkali to form sodium pyridine carboxylate, dissolving the sodium salt in water, neutralizing the sodium salt solution to the isoelectric point of the particular pyridine carboxylic acid, cooling to crystallize the pyridine carboxylic acid and recovering the crystallized pyridine carboxylic acid. This process, while satisfactory in many respects, results in the formation of large quantities of dilute solutions of ammonium or alkali metal sulfates from the drowning and neutralization of the oxidation mass, which presents a severe loss of sulfuric acid as well as a serious waste disposal problem if the dilute solution is discarded as it usually is in practice, since recovery of the sulfates themselves or of sulfuric acid values from such solutions is not economically practical.

A primary object of the present invention is to provide a process for recovering pyridine carboxylic acids and sulfuric acid from mixtures thereof.

A further object of the present invention is to provide a process for recovering pyridine carboxylic acids from mixtures thereof with concentrated sulfuric acid, in which the waste disposal problem is minimized or avoided, and in which substantial recoveries of sulfuric acid values are effected.

A still further object of the invention is to provide such a recovery process in which recovery of excess sulfuric acid is accomplished with the evaporation of little or no water.

It is a still further object of the invention to provide a cyclic process for recovering pyridine carboxylic acids from concentrated sulfuric acid solutions wherein at least the major portion of the sulfuric acid is reutilized in the process.

These and other objects are accomplished according to my invention wherein a mixture of pyridine carboxylic acid of the character described with concentrated sulfuric acid is diluted with a controlled limited quantity of water to within a sulfuric acid concentration range in which the pyridine carboxylic acid-sulfuric acid complex (e. g. nicotinic acid bisulfate) has reduced solubility characteristics, to precipitate, with or without cooling, a substantial proportion of the pyridine carboxylic acid as pyridine carboxylic acid bisulfate, recovering the precipitated pyridine carboxylic acid bisulfate, and, if desired, reconstituting all or a major portion of the diluted mother liquor to concentrated sulfuric acid of a character suitable for reuse in a subsequent oxidation step.

Figure 2:
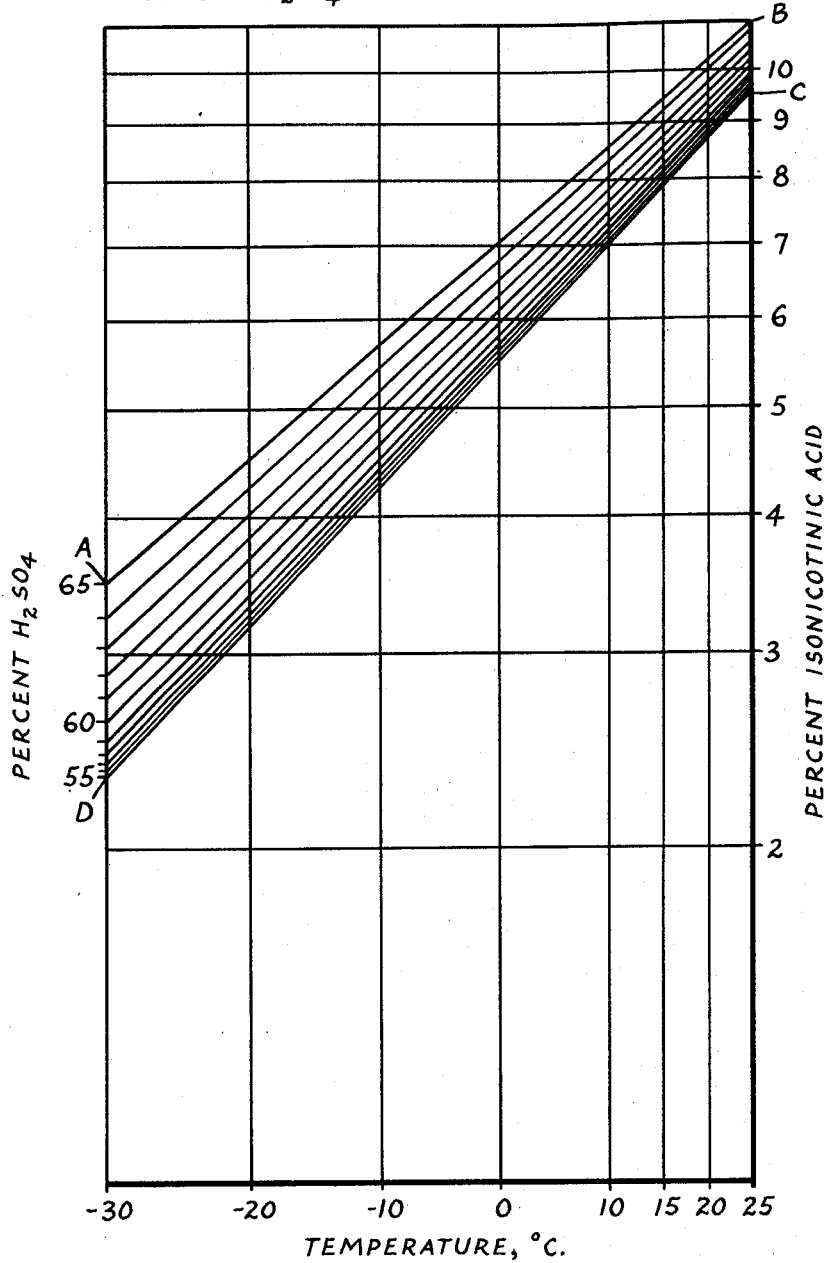
Figure 3:
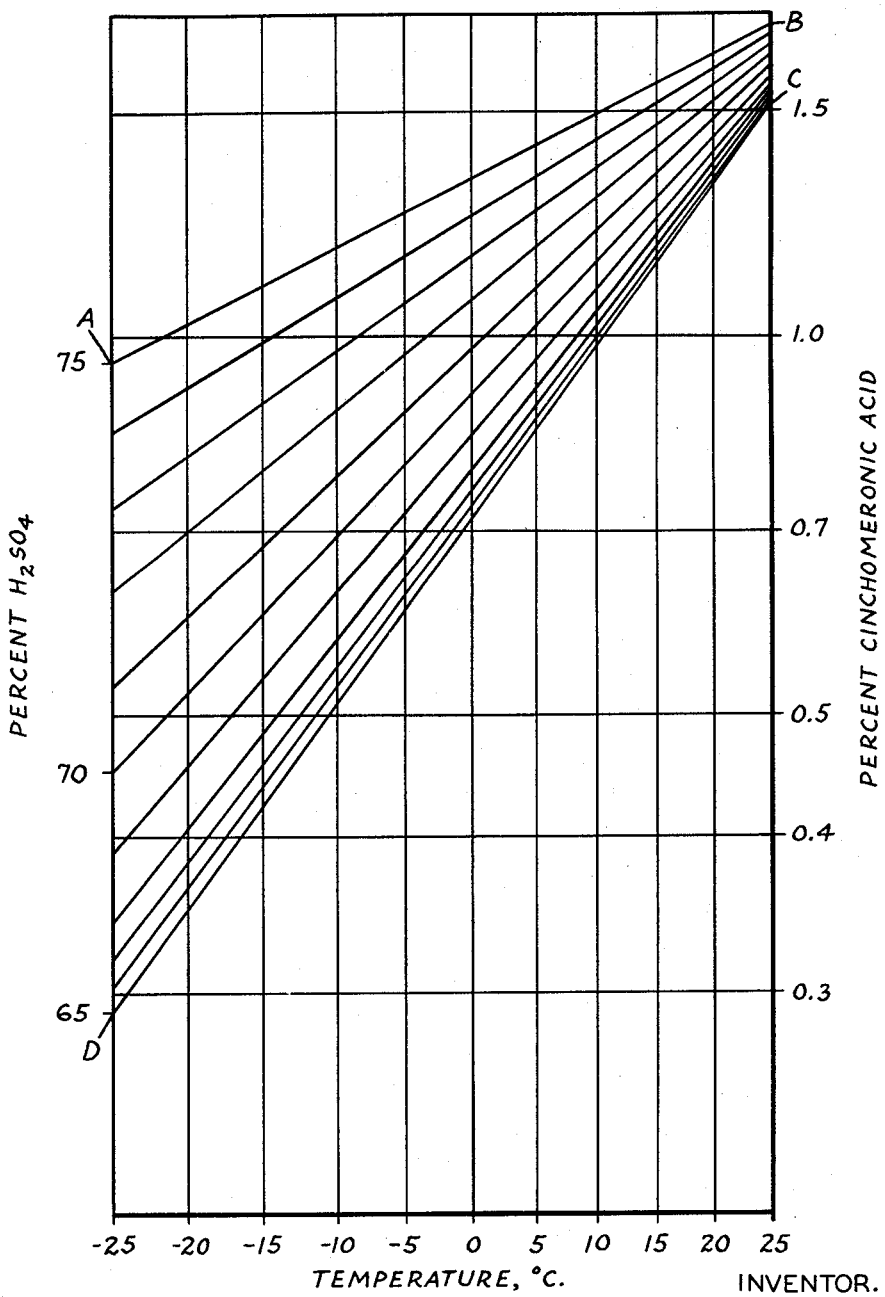

In the accompanying drawings, Figure 1 represents a chart showing, in a series of graphs, the solubilities of nicotinic acid (3-pyridine carboxylic acid) in aqueous sulfuric acid solutions at concentrations between 75% and 55%, and at temperatures between —20° C. and +25° C., the nicotinic acid solubilities under these conditions ranging from less than 3% to slightly more than 18%. Figure 2 represents a similar chart showing the solubilities of isonicotinic acid (4-pyridine carboxylic acid) in aqueous sulfuric acid solutions at concentrations between 55% and 65% and at temperatures between —30° C. and +25° C. Figure 3 represents a similar chart showing the solubilities of cinchomeronic acid (3,4- pyridine dicarboxylic acid), at concentrations between 65% and 75% and at temperatures between −25° C. and +25° C. The individual lines in the several charts represent the solubilities of the particular pyridine carboxylic acid in terms of percent pyridine carboxylic acid, designated as ordinates on the right side of the graph, in saturated sulfuric acid solutions at the single concentrations indicated at the left of the graph and at the temperatures in degrees centigrade as shown as abscissae. The lines are spaced apart in small increments, of one percent concentration in the case of nicotinic and isonicotinic acids and about two percent in the case of cinchomeronic acid and thus, taken together, provide virtually complete representations of the particular pyridine carboxylic acid solubilities within the temperature and sulfuric acid concentration ranges included within the limits designated as the areas A, B, C, D on the charts. In calculating the sulfuric acid concentrations shown in the figures, only the free acid, over and above that necessary to combine with the pyridine carboxylic acid to form the bisulfate, is included. Consequently, when the term "sulfuric acid" is used throughout the specification and claims, it includes only free sulfuric acid not combined with the pyridine carboxylic acid in the form of pyridine carboxylic acid bisulfate even when the term is used in describing solutions of these materials unless otherwise qualified. Percentage concentrations of sulfuric acid when referred to herein are the percent of sulfuric acid based on the total of free sulfuric acid and water in the mixture.

By "concentrated" sulfuric acid as used herein is meant a mixture of water and sulfuric acid containing a higher percentage of free sulfuric acid on the basis of the total of water and free sulfuric acid in the solution than the concentration of minimum pyridine carboxylic acid solubility of the particular pyridine carboxylic acid as explained hereinafter, e. g. 55% in the case of nicotinic and isonicotinic acids, and 65% in the case of cinchomeronic acid, that is, exclusive of pyridine carboxylic acid bisulfate and other materials which may also be present in solution. Accordingly, when the term "concentrated" sulfuric acid is used herein, it is to be understood to have the above meaning unless otherwise limited.

In calculating the percentage of pyridine carboxylic acid (which actually is present in solution as the pyridine carboxylic acid bisulfate), the total of all the materials in solution is taken as 100%, including the pyridine carboxylic acid bisulfate, free sulfuric acid, and water.

In carrying out the process according to my invention, a pyridine carboxylic acid oxidation mass consisting essentially of concentrated sulfuric acid and a pyridine carboxylic acid is diluted with a controlled, limited quantity of water, sufficient to bring about precipitation at the desired temperature of a portion of the pyridine carboxylic acid contained in the oxidation mass, as the crystalline, equimolecular, pyridine carboxylic acid-sulfuric acid complex (e. g. nicotinic acid bisulfate). The diluted oxidation mass may be filtered at this stage if the dilution alone has been sufficient to precipitate the desired amount of pyridine carboxylic acid bisulfate. The dilution may be carried out at the finally desired temperature, or the oxidation mass may be cooled before, during or after dilution to a temperature sufficiently low to bring about the desired precipitation of pyridine carboxylic acid bisulfate consonant with the requirements of subsequent use of the mother liquor, as described more fully hereinafter, and to leave the desired residuum of pyridine carboxylic acid in the mother liquor. The crystalline pyridine carboxylic acid bisulfate is then separated from the acid-complex mother liquor by suitable means, for example as by filtration or centrifugation. The filter cake may be washed, if desired, with sulfuric acid to free the crystals from entrained solid material such as catalyst, if employed, and may then be further processed by any suitable means for recovery of pyridine carboxylic acid; for example by slurrying the pyridine carboxylic acid bisulfate in a lower aliphatic alcohol such as n-butanol, adding sufficient ammonia to combine with the sulfuric acid of the pyridine carboxylic acid bisulfate, forming alcohol-insoluble ammonium sulfate and releasing the pyridine carboxylic acid which dissolves in the alcohol, whereupon the two phases may be separated as by filtration, and the pyridine carboxylic acid recovered from the alcohol by crystallization and purified, if desired, by crystallization from water, as described in copending application Serial No. 222,543 of Andrew J. Martin filed as of even date herewith.

The mother liquor remaining after removal of the pyridine carboxylic acid bisulfate from the diluted oxidation mass, consisting essentially of sulfuric acid, water and a minor proportion of pyridine carboxylic acid, may be reconstituted by suitable means to substantially water free concentrated sulfuric acid (i. e. to about 95–101% sulfuric acid) for use in a subsequent oxidation mixture for the oxidation of a fresh batch of N-heteroaryl compound, utilizing all of the mother liquor or selected portions thereof as desired, by coordinating the extent of dilution and/or cooling practiced in the precipitation steps, with the composition of the subsequent oxidation mixture in a manner described hereinafter.

The coordination of conditions to obtain the valuable results above referred to is made possible by my discovery that, within the range of sulfuric acid concentrations between 100% and a lower concentration limit of minimum pyridine carboxylic acid solubility varying with the particular pyridine carboxylic acid, the solubilty of the pyridine carboxylic acid in aqueous sulfuric acid solutions decreases as the sulfuric acid concentration decreases, permitting larger quantities of pyridine carboxylic acid to be precipitated (as the bisulfate) from dilute solutions than from more concentrated solutions at the same temperature. This decrease in solubility in the cases of nicotinic and isonicotinic acids with decrease in concentration of sulfuric acid, persists down to a concentration of about 55%, and of cinchomeronic acid down to about 65%, whereupon their solubilities begin to increase with further dilution of the sulfuric acid with water. Thus, any solution of the pyridine carboxylic acid in concentrated sulfuric acid which contains a quantity of the pyridine carboxylic acid in excess of that required to provide a saturated solution thereof after dilution with water down to the sulfuric acid concentration of minimum pyridine carboxylic acid solubility as defined, may be treated according to my invention to recover the pyridine carboxylic acid bisulfate therefrom. Mixtures of concentrated sulfuric acid and pyridine carboxylic acid containing even small quantities of pyridine carboxylic acid may be treated according to the controlled dilution process of my invention for the recovery of pyridine carboxylic acid and sulfuric acid therefrom; in the case of nicotinic acid, down to about 9% nicotinic acid concentration at 25° C., about 4.5% at 0° C., or even lower amounts, if dilution is carried out at lower temperatures as indicated in Fig. 1, as well as mixtures containing much larger quantities of nicotinic acid, up to the saturation point of nicotinic acid in 100% sulfuric acid at the particular temperature employed, i. e. about 20% at 0° C., and considerably higher at higher temperatures. Minor dilutions of highly concentrated mixtures, especially if accompanied or followed by cooling, accomplish some precipitation of pyridine carboxylic acid bisulfate which can be recovered according to my process and the resulting mother liquor recycled. In such cases, however, the quantity of pyridine carboxylic acid remaining in the recycled mother liquor is relatively large, and while, in the case of nicotinic acid, such recycled pyridine carboxylic acid is not lost or decomposed in recycling, in the case of pyridine polycarboxylic acids, it may be decomposed to a monocarboxylic acid and, moreover, the steady state which is reached with respect to residuum of pyridine carboxylic acid in the recycle system is so high as to be uneconomic. Accordingly, I prefer to carry out an amount of dilution and cooling at least sufficient to precipitate an appreciable quantity of pyridine carboxylic acid bisulfate and preferably sufficient to bring the resulting solution to within the concentration and temperature ranges illustrated by the areas A, B, C, D in the figures, that is, in the case of nicotinic acid to a $H_2SO_4$ concentration between about 75% and about 55% and to a temperature below about 25° C. and preferably to between about −20° C. and about +25° C., and to leave in solution in the recovery of nicotinic acid, quantities of nicotinic acid not greater than about .5 mol per mol of N-heteroaryl compound oxidized. Cooling below −20° C. may be practiced if desired, but usually is not necessary.

Nicotinic acid-containing oxidation masses obtained by the sulfuric acid or mixed sulfuric-nitric acid oxidation of N-heteroaryl compounds usually contain between about 10% and about 30% nicotinic acid in substantially water free sulfuric acid, i. e. usually between about 98% and about 101% sulfuric acid, although the sulfuric acid concentrations in some cases may run as low as 90%. Such mixtures are especially adapted for use in the process of my invention.

When pyridine carboxylic acid-containing oxidation masses of the above character are diluted with water, with or without cooling, to within the sulfuric acid concentration ranges of low pyridine carboxylic acid solubility indicated, a substantial proportion of the pyridine carboxylic acid is precipitated as the pyridine carboxylic acid-sulfuric acid complex (e. g. nicotinic acid bisulfate), leaving in solution minor proportions of pyridine carboxylic acid; and the amount of dilution and temperature may be controlled, if desired, to provide a resulting mother liquor which can be recycled in its entirety or in part for reuse as the sulfuric acid component of a subsequent oxidation by simple reconstitution leaving the desired small residuum of pyridine carboxylic acid in the recycled liquor. The reconstitution of the diluted mother liquor may take the form of treatment with sulfuric anhydride ($SO_3$) to convert the added water to $H_2SO_4$, with or without admixture of additional $H_2SO_4$ depending upon the degree of dilution and the desired composition of the subsequent oxidation mixture; or the $SO_3$ treatment may be supplemented by distillation of a portion of the excess water in the liquor. As the amount of water contained in sulfuric acid solutions at any of the concentrations within the contemplation of this invention is relatively small (in no case more than about 45% water), the evaporation, even of substantially all the excess water in the mother liquor, does not result in an unduly costly recovery process, and the evaporation of a part thereof, supplemented by $SO_3$ conversion of the remainder, often offers an economic advantage.

In one modification of my invention, particularly adapted for use in the recovery of nicotinic acid, the entire mother liquor resulting after separation of nicotinic acid bisulfate, is reutilized in a subsequent oxidation by simple chemical fortification of the motor liquor with $SO_3$ alone. In this modification, illustrated in Example I, the degree of completeness of precipitation of nicotinic acid bisulfate and the temperature of crystallization are so coordinated with the desired composition of the subsequent oxidation mixture that the quantity of the dilution water added to the oxidation mass in each cycle is exactly equivalent to the sulfuric acid lost in the oxidation process plus whatever water is to be added with other constituents of the subsequent oxidation mixture, for example as concentrated (90%) nitric acid in the case of sulfuric-nitric acid oxidations. This coordination produces a mother liquor in which the total amount of water and free sulfuric acid are exactly equivalent to the amount of $H_2SO_4$ required in the mixture to be used for a subsequent oxidation of the N-heteroaryl compound. This total is a constant for any specified oxidation feed mix and depends on the N-heteroaryl compound to be oxidized, the presence or absence of other oxidizing agents, such as nitric acid, with the sulfuric acid, etc.

When operating according to this modification of my invention in which, as explained above, the degree of dilution is fixed by its equivalence to the $H_2SO_4$ lost in the oxidation, only one condition in addition to dilution may be selected arbitrarily from the coordinated physical conditions shown in the figures, capable of yielding the desired coordinated results with respect to residual water in the mother liquor, etc. Thus, either the temperature of the crystallization or the amount of nicotinic acid to be recycled (but not both) may be selected at any point along the particular concentration line fixed by the required dilution. Setting an amount of nicotinic acid to be recycled, automatically fixes the temperature of crystallization for any given dilution, and setting the temperature of crystallization determines the residual nicotinic acid which must be recycled.

The amount of water which can be used for dilution of an oxidation mass should be as small as possible, consistent with the achievement of other desiderata as explained herein, particularly at dilutions which exceed the critical maximum for recycling all of the mother liquor, since lower dilutions either entirely obviate the necessity for any evaporation of water, or reduce the amount of such evaporation required to reconstitute the substantially anhydrous oxidation mixture.

The amount of dilution water which can be used to produce a mother liquor which can be recycled in its entirety by chemical fortification, depends on the particular oxidation process as brought out above.

If nitric acid is used as a part of the oxidizing agent in the form of the conventional 90% $HNO_3$, the amount of water available for dilution is reduced by the amount added from this source in fortifying the mother liquor for reuse. For example, assuming that an oxidation feed mix prepared from

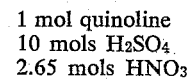

1 mol quinoline
10 mols $H_2SO_4$
2.65 mols $HNO_3$ produces an oxidation mass containing 25% nicotinic acid with a yield of 95 mol per cent under non-cyclic conditions; assuming further that 0.2 mol of nicotinic acid per mol of quinoline fed to the oxidizer is to be recycled, then such an oxidation mass has been found to contain, per mol of quinoline fed to the oxidizer

| | Mols |
|---|---|
| Nicotinic acid (as $H_2SO_4$ complex) | 1.15 |
| Free $H_2SO_4$ | 2.65 |

The amount of sulfuric acid that must be added to the recycled nicotinic acid bisulfate mother liquor to obtain the required oxidation feed mix composition of 10 mols of $H_2SO_4$ per mol of quinoline is 7.35 mols of $H_2SO_4$ (10 minus 2.65). If 100% nitric acid is used to obtain the required 2.65 mols of $HNO_3$, and if $SO_3$ is used to supply the required 7.35 mols of $H_2SO_4$, then it will be possible to use 7.35 mols (132.3 grams) of water per mol of quinoline for purposes of dilution.

However, if 90% $HNO_3$ is used to supply the $HNO_3$ requirements, approximately one mol of water will be added from this source. Thus, the maximum quantity of water that can be used for dilution of the oxidation mass is 6.35 mols (7.35 minus 1.0) or 114.3 grams, again assuming that $SO_3$ is used to supply the required 7.35 mols of $H_2SO_4$. The oxidation mass so diluted will thus contain 371.8 grams of 69% $H_2SO_4$. To bring the nicotinic acid content of this amount of aqueous sulfuric acid solvent down to 0.2 mol of nicotinic acid for recycling (i. e. to 24.6 grams of nicotinic acid, or 45.2 grams of nicotinic acid bisulfate, or a 5.9% nicotinic acid solution), the diluted oxidation mass must be cooled to —15° C. (see Figure 1).

Thus, for any particular oxidation mass, the maximum amount of water available for dilution, to produce a mother liquor which may be reconstituted by chemical means alone, for recycling to a subsequent oxidation, can readily be calculated from a knowledge of the composition and character of the desired oxidation feed mix by the aid of the sulfuric acid concentration—pyridine carboxylic acid solubility curves set forth in the figures.

Where economic considerations direct, or where it is not expedient to utilize the precise conditions called for in the modification of my process described above, or where higher dilutions of the oxidation mass are made, the excess of free water may be removed from the resulting mother liquor in part before reconstituting the liquor for reuse, for example by evaporation or distillation, without appreciable loss of the residual pyridine carboxylic acid, and without sacrifice of sulfuric acid. Such evaporation will normally remove sufficient water to bring the sulfuric acid concentration within the range of about 75% to about 95%. Because sulfur trioxide is evolved on further concentration, distillation is preferably continued only to 85% to 90% sulfuric acid content. In either case, the reconstitution of the liquor is completed by addition of sulfur trioxide or oleum. If distillation is not resorted to, higher dilutions may nevertheless be used by bleeding off or sacrificing quantities of sulfuric acid which are in proportion to the excess of added water over that equivalent to the sulfuric acid necessary for reconstitution of the oxidation feed mix as explained above. At lower dilutions, larger quantities of pyridine carboxylic acid remain in the mother liquor and are recycled to the oxidizer.

The dilution of the oxidation mass may be carried out using fresh water or it may be carried out using dilute pyridine carboxylic acid solutions such as, for example, the mother liquor obtained from the crystallization of pyridine carboxylic acid from aqueous solutions thereof, and containing, for example, from 1% to 2% in the case of nicotinic acid.

If the pyridine carboxylic acid bisulfate filter cake is washed with sulfuric acid, the quantity of $H_2SO_4$ added should be taken into account in reconstituting the mother liquor for reuse in a subsequent oxidation.

The following specific examples will further illustrate my invention. Parts are by weight except as otherwise indicated.

EXAMPLE I 137 parts of mother liquor from a previous run, carried out so as to provide a mother liquor, which when mixed with the quantity of nitric acid to be used in the present run, would contain a total of water and free sulfuric acid equivalent to the sulfuric acid required in the present oxidation, and containing 14.5% nicotinic acid bisulfate (8.1% nicotinic acid), 42% free $H_2SO_4$ and 43.5% water, was divided into two portions and treated as follows:

| | Parts |
|---|---|
| Starter: | |
|     Mother liquor from previous run | 62 |
|     $SO_3$ | 55.5 |
| Feed mix: | |
|     Mother liquor from previous run | 75 |
|     $HNO_3$ (90%) | 60.3 |
|     $SO_3$ | 170 |
|     Quinoline (in the form of nitroquinoline) | [1] 41.9 |
|     $SeO_2$ | 0.03 |

[1] Ca. .3 mol.

*Oxidation.*—The starter charge was placed in an oxidation vessel and heated rapidly to 315° C. The feed mix was then added to the reaction vessel over a period of ten minutes while maintaining the temperature at 315°–320° C. The charge was then digested for five minutes at 335°–340° C., whereupon the oxidation mass was allowed to cool to room temperature and was siphoned from the reactor. The resulting anhydrous oxidation mass amounted to 179 parts by weight and contained 26.4% nicotinic acid and 46.4% of free sulfuric acid. The distillate collected from the oxidation process amounted to 152 parts by weight and contained 64.6% sulfuric acid, a loss of about 98 parts of sulfuric acid by distillation.

*Dilution and crystallization.*—Sufficient $H_2O$ (59 parts) was added to the oxidation mass obtained above to reduce the free sulfuric acid to 55% strength. The resulting mixture was cooled slowly with agitation over a period of about three hours to 10° C., at which temperature the solubility of nicotinic acid in a sulfuric acid solution of 55% concentration is only about 3.4% as indicated in Figure 1, whereupon nicotinic acid bisulfate crystallized out of solution.

*Separation of nicotinic acid bisulfate.*—The cold, free flowing slurry of nicotinic acid bisulfate was poured into a slowly spinning centrifuge and centrifuged for one hour. The resulting 71 parts of centrifuge cake contained 10.8% free sulfuric acid, and 44.1% nicotinic acid. The resulting 157 parts of mother liquor contained 48% $H_2SO_4$ and 8.2% nicotinic acid. The yield of nicotinic acid calculated as follows:

Percent yield = 100 ×

$$\frac{\text{Nicotinic acid in oxidation mass minus nicotinic acid in liquor recycled from previous run}}{\text{Nicotinic acid equivalent to quinoline charged}}$$

was 90.5%. The mother liquor was collected and reutilized in a succeeding run as described above.

EXAMPLE II 142 parts by weight of mother liquor obtained from a final crystallization of nicotinic acid from water (and containing about 2.5% nicotinic acid, the remainder water) were charged to a water jacketed glass-lined kettle equipped with agitating means. To this mother liquor were added slowly over a period of about 50 minutes, while agitating and cooling by means of water circulation in the kettle jacket, 480.5 parts by weight (two parts by volume to one part by volume of mother liquor) of nicotinic acid oxidation mass having approximately the following weight percentage composition

| | Per cent |
|---|---|
| Nicotinic acid | 24 |
| Total sulfuric acid | 72 |
| Water | 4 |
| | 100 |

The sulfuric acid concentration of the oxidation mass was thus 93.7% by weight, based on the total quantity of water and free sulfuric acid in the charge.

During addition of the oxidation mass to the aqueous diluting liquor, the temperature of the charge rose from 28° C. to 88° C. due to the heat of dilution of the concentrated sulfuric acid oxidation mass. The dilution reduced the sulfuric acid concentration of the charge to about 61.4% by weight, based on the total quantity of water and free sulfuric acid in the charge. The charge was next cooled to 57.5° C. in a period of about an hour, by the addition to the charge of crushed solid $CO_2$ (Dry Ice). At this point, scattered crystals of nicotinic acid bisulfate began to form. Cooling of the charge was continued by the addition of Dry Ice, the addition being at such a rate as to provide a cooling rate of approximately 15° C. per hour until the charge temperature reached —25° C. in a period of about six hours and a large mass of nicotinic acid bisulfate crystals had precipitated.

The slurry in the kettle was next fed by gravity to a centrifuge, and the mass was centrifuged to separate crystals from mother liquor. When the centrifuge cake was "dry," the cake was washed in the centrifuge with 40 parts by weight of concentrated sulfuric acid (94.5%) to remove traces of catalyst and again "dried." The filtrate amounted to approximately 476 parts having approximately the following weight percentage composition

|  | Per cent |
|---|---|
| Nicotinic acid | 7.1 |
| Total sulfuric acid | 58.5 |
| Water | 34.4 |
|  | 100.0 |

The filtrate was recycled to the oxidation plant, and fortified with $SO_3$, $HNO_3$ and catalyst for use as oxidation liquor in a further oxidation of N-heteroaryl compound.

The nicotinic acid bisulfate filter cake, amounting to about 186.5 parts was recovered and further processed to convert it to nicotinic acid.

EXAMPLE III

A series of ten runs was made in which the mother liquor from each run was recycled to the succeeding run after separation of the nicotinic acid bisulfate from the liquor and removal of a portion of the dilution water by distillation. About 20% of the nicotinic acid in each oxidation mass was recycled to the succeeding oxidation step, a quantity equivalent to about 0.2 mol per mol of quinoline oxidized. These runs were carried out as follows: nitroquinoline was oxidized to nicotinic acid by charging into a reaction vessel the following materials in the order given:

(1) Concentrated mother liquor from the previous run.
(2) Sufficient 95% $H_2SO_4$ and $SO_3$ to bring the free $H_2SO_4$ content to approximately 2.5 mols, while maintaining the temperature during this step below 50° C.
(3) 0.846 mol of 90% $HNO_3$, keeping the maximum temperature limited to 80° C. during this step.
(4) 0.325 mol of quinoline, maintaining the maximum temperature limited to 80° C. during this step in which the quinoline was converted to nitroquinoline.
(5) .3 gram of $SeO_2$ or equivalent amount of $SeOCl_2$.

The charge thus prepared was added over a period of nine to eleven minutes to a "starter" charge of .96 mol of concentrated $H_2SO_4$ which had previously been heated to 315° C., during which time the temperature was maintained at 315°–320° C. As soon as the addition was complete the temperature of the mass was raised to 340° C. and then maintained at 335°–340° C. for five minutes during which the oxidation to nicotinic acid was completed.

The oxidation mass thus obtained was transferred to a crystallizing vessel, the required amount of water was added to the charge to reduce the free sulfuric acid in the oxidation mass to 55% to 60% strength, and the solution was cooled rapidly to 50° C. The temperature was then reduced gradually to 5° C. to 10° C. over a period of three hours during which time nicotinic acid bisulfate crystallized out of solution.

The slurry of nicotinic acid bisulfate at 5° C. to 10° C. was poured into a basket centrifuge revolving at 2500 R. P. M. and was centrifuged for one hour, then the cake was removed and weighed. The mother liquor was collected in a distillation flask, and concentrated by distilling off the water to a pot temperature of 280° C. to 300° C. The concentrated mother liquor, free of the major portion of the dilution water, was then fortified with concentrated sulfuric acid and $SO_3$, as described in step No. 2 above, and used in the next cycle.

Details of the ten runs are given in Tables I to IV below.

Table I shows the compositions of the individual oxidation feed mixes, and of the resulting oxidation masses after reaction for the ten runs.

Table II shows the compositions of the oxidation masses after dilution and compositions of the separated filter cakes and mother liquors.

Table III shows the compositions of the concentrated mother liquors after evaporation of a major portion of the water, and the make-up compositions used in reconstituting the mother liquor for reuse.

Table IV lists the quantity of nicotinic acid in the oxidation charge at the start of each cycle, the total quantity removed, the quantity removed as product and the percent yield based on the quinoline charged. This table indicates that the nicotinic acid yield remains consistently high during the recycling, and that very little, if any, nicotinic acid is destroyed in the oxidizer.

*Table I.—Compositions of feed mixes and resulting oxidation masses*

| Material | Run Number; Parts By Weight | | | | | | | | | |
|---|---|---|---|---|---|---|---|---|---|---|
|  | 1 | 2 | 3 | 4 | 5 | 6 | 7 | 8 | 9 | 10 |
| *In* | | | | | | | | | | |
| Charge: | | | | | | | | | | |
| $H_2SO_4$ (Total) | 251.4 | 254 | 261 | 263 | 256 | 266 | 261 | 260 | 265 | 271 |
| $H_2SO_4$ (Free) | 245 | 245 | 248 | 251 | 246 | 256 | 249 | 247 | 255 | 259 |
| Nicotinic Acid | 8.0 | 10.3 | 14.6 | 13.3 | 11.0 | 10.9 | 11.9 | 11.0 | 12.1 | 12.4 |
| $HNO_3$ | 54.3 | 54.3 | 54.3 | 54.3 | 54.3 | 54.3 | 54.3 | 54.3 | 54.3 | 54.3 |
| Quinoline | 41.9 | 41.9 | 41.9 | 41.9 | 41.9 | 41.9 | 41.9 | 41.9 | 41.9 | 41.9 |
| $H_2O$ | 0 | 0 | 0 | 0 | 0 | 0 | 0 | 0 | 0 | 0 |
| $SeO_2$ | 0.3 | 0.3 | 0.3 | 0.3 | 0.3 | 0.3 | 0.3 | 0.3 | 0.3 | 0.3 |
| Starter: | | | | | | | | | | |
| $H_2SO_4$ | 94 | 94 | 94 | 94 | 94 | 94 | 94 | 94 | 94 | 94 |
| $H_2O$ | 5 | 5 | 5 | 5 | 5 | 5 | 5 | 5 | 5 | 5 |
| *Out* | | | | | | | | | | |
| Distillate: | | | | | | | | | | |
| $H_2SO_4$ | 104.5 | 98.5 | 87.1 | 86.3 | 95.4 | 97.7 | 92.6 | 96.2 | 96.2 | 96.8 |
| $H_2O$ | 35.5 | 35.5 | 35.9 | 39.7 | 38.6 | 34.3 | 37.4 | 36.8 | 36.8 | 39.2 |
| Oxidation Mass: | | | | | | | | | | |
| $H_2SO_4$ (Total) | 123.2 | 133.3 | 135.8 | 130.8 | 126.0 | 141.1 | 138.5 | 130.3 | 137.8 | 143.7 |
| $H_2SO_4$ (Free) | 88.5 | 96.4 | 91.2 | 89.0 | 85.8 | 101.8 | 97.6 | 89.6 | 97.1 | 101.3 |
| Nicotinic Acid | 41.8 | 44.3 | 51.3 | 50.1 | 47.8 | 46.3 | 48.4 | 47.8 | 48.2 | 50.2 |
| $H_2O$ | 3.2 | 0.7 | 3.6 | 5.1 | 5.9 | 6.5 | 4.9 | 4.5 | 5.1 | 5.1 |

Table II.—Compositions of diluted oxidation masses and of filter cakes and mother liquors

| Material | Run Number; Parts By Weight | | | | | | | | | |
|---|---|---|---|---|---|---|---|---|---|---|
| | 1 | 2 | 3 | 4 | 5 | 6 | 7 | 8 | 9 | 10 |
| *In* | | | | | | | | | | |
| Oxidation Mass | 167 | 176 | 193 | 183 | 179 | 193 | 191 | 181 | 190 | 198 |
| $H_2SO_4$ (Free) | 87 | 93.6 | 88.9 | 86.1 | 84 | 99.2 | 94.8 | 87.2 | 96.4 | 99.8 |
| $H_2O$ (Added) | 68 | 76 | 57 | 62 | 60 | 61 | 69 | 64 | 69 | 70 |
| $H_2O$ (Total) | 71 | 77 | 60.1 | 67.1 | 65.8 | 67.3 | 73.8 | 68.5 | 73.9 | 75 |
| $H_2SO_4$, Percent Concentration | 55 | 54.9 | 60 | 56.2 | 56 | 59.7 | 56.2 | 56.0 | 56.6 | 57.1 |
| *Out* | | | | | | | | | | |
| Filter Cake (Wet NABS) | 67 | 60 | 77 | 74 | 72 | 69 | 73 | 71 | 71 | 70 |
| $H_2SO_4$ (Total) | 31.8 | 27.2 | 36.3 | 33.5 | 32.8 | 31.0 | 33.2 | 32.9 | 33.1 | 32.1 |
| $H_2SO_4$ (Free) | 5.4 | 4.8 | 8.2 | 4.0 | 4.8 | 4.5 | 5.1 | 6.5 | 4.4 |
| Nicotinic Acid | 27.7 | 27.8 | 34.5 | 36.5 | 34.6 | 33.4 | 35.6 | 34.6 | 32.9 | 34.2 |
| $H_2O$ | 7.3 | 4.7 | 5.6 | 3.3 | 4.1 | 3.4 | 3.8 | 3.4 | 4.5 | 3.2 |
| Mother Liquor | 151 | 197 | 169 | 173 | 166 | 190 | 186 | 175 | 190 | 205 |
| $H_2SO_4$ (Total) | 81.7 | 100.5 | 97.8 | 94.2 | 90.5 | 108.5 | 101.4 | 96.9 | 106.8 | 114 |
| $H_2SO_4$ (Free) | 70.8 | 87.0 | 85.2 | 83.2 | 80.0 | 96.4 | 90.2 | 85.0 | 94.1 | 100 |
| Nicotinic Acid | 10.7 | 15.1 | 13.8 | 11.3 | 11.2 | 12.3 | 11.4 | 12.5 | 12.9 | 14.5 |
| $H_2O$ | 57.2 | 79.4 | 56.2 | 64.9 | 61.4 | 65.8 | 69.8 | 62.6 | 66.5 | 72.6 |

Table III.—Compositions of concentrated mother liquors and make-up compositions used in reconstituting $H_2SO_4$ for use in subsequent oxidation

| Material | Run Number; Parts By Weight | | | | | | | | | |
|---|---|---|---|---|---|---|---|---|---|---|
| | 1 | 2 | 3 | 4 | 5 | 6 | 7 | 8 | 9 | 10 |
| *In* | | | | | | | | | | |
| Mother Liquor | 146 | 190 | 163 | 168 | 161 | 184 | 180 | 169 | 183 | 200 |
| *Out* | | | | | | | | | | |
| Distillate | 47 | 70 | 45 | 57 | 54 | 59 | 61 | 54 | 61 | 55 |
| $H_2SO_4$ | 0.8 | 1.7 | 0.9 | 1.1 | 1.1 | 1.7 | 1.7 | 1.5 | 1.2 | 1.9 |
| $H_2O$ | 46.2 | 68.3 | 44.1 | 55.9 | 52.9 | 57.3 | 59.3 | 52.5 | 59.8 | 53.1 |
| Concentrate | 94 | 120 | 115 | 111 | 106 | 125 | 117 | 112 | 121 | 132 |
| $H_2SO_4$ (Total) | 78.2 | 95.2 | 93.4 | 90.4 | 86.7 | 103.5 | 98.1 | 92.1 | 101.6 | 109.4 |
| $H_2SO_4$ (Free) | 67.6 | 82.2 | 81.1 | 79.7 | 76.5 | 91.6 | 87.3 | 80.6 | 89.4 | 95.4 |
| Nicotinic Acid | 10.3 | 14.6 | 13.3 | 11.0 | 10.9 | 11.9 | 11.0 | 12.1 | 12.4 | 14.1 |
| $H_2O$ | 5.1 | 8.3 | 6.0 | 7.0 | 6.0 | 6.1 | 4.6 | 5.0 | 3.4 | 4.7 |
| Make-Up: | | | | | | | | | | |
| Concentrate | 93 | 120 | 115 | 111 | 106 | 125 | 117 | 112 | 121 | End |
| $H_2SO_4$ (95%) | 94.8 | 80.7 | 88.2 | 80.2 | 69 | 74.6 | 77.8 | 88 | 84.3 | of |
| $SO_3$ | 71.3 | 72.8 | 69.7 | 73.3 | 91.8 | 70.9 | 69.9 | 72.8 | 72.8 | Series |

Table IV.—Nicotinic acid at various stages of process

| Run No. | Parts by Weight Nicotinic Acid In— | | | Yield, Percent |
|---|---|---|---|---|
| | Oxidation Charge | Oxidation Mass | Product | |
| 1 | 8.0 | 41.8 | 33.8 | 84.5 |
| 2 | 10.3 | 44.3 | 34.0 | 85.0 |
| 3 | 14.6 | 51.3 | 36.7 | 91.8 |
| 4 | 13.3 | 50.1 | 36.8 | 92.0 |
| 5 | 11.0 | 47.8 | 36.8 | 92.0 |
| 6 | 10.9 | 46.3 | 35.4 | 88.5 |
| 7 | 11.9 | 48.4 | 36.5 | 91.2 |
| 8 | 11.0 | 47.8 | 36.8 | 92.0 |
| 9 | 12.1 | 48.2 | 36.1 | 90.2 |
| 10 | 12.4 | 50.2 | 37.8 | 94.5 |

While the above illustrates the preferred embodiments of my invention, it will be understood that departures may be made therefrom within the scope of the specification and claims.

I claim:

1. A process for recovering pyridine carboxylic acid bisulfates from mixtures thereof with concentrated sulfuric acid having concentrations in excess of 55% based on the weight of water and free sulfuric acid in the mixture, which comprises diluting the mixture, containing a quantity of pyridine carboxylic acid in excess of that required to provide a saturated solution thereof at the eventual temperature after dilution, with a controlled limited quantity of water sufficient to reduce the sulfuric acid concentration to not less than that concentration of free sulfuric acid, based on the total quantity of water and free sulfuric acid in the resulting mixture, which is the concentration of minimum pyridine carboxylic acid solubility, in any case not less than 55%, cooling the diluted mixture to a temperature below about 25° C., whereby pyridine carboxylic acid bisulfate is precipitated from the solution and thereafter separating pyridine carboxylic acid bisulfate from the aqueous sulfuric acid mother liquor.

2. A process for recovering pyridine carboxylic acid bisulfates from mixtures thereof with concentrated sulfuric acid having concentrations in excess of 55% based on the weight of water and free sulfuric acid in the mixture, which comprises diluting the mixture, containing a quantity of pyridine carboxylic acid in axcess of that required to provide a saturated solution thereof at the eventual temperature after dilution, with a controlled limited quantity of water sufficient to reduce the sulfuric acid concentration to not less than that concentration of free sulfuric acid based on the total quantity of water and free sulfuric acid in the resulting mixture which is the concentration of minimum pyridine carboxylic acid solubility, in any case not less than 55% followed by cooling to a value not greater than about 25° C., whereby pyridine carboxylic acid bisulfate is precipitated from solution, and thereafter separating pyridine carboxylic acid bisulfate from the aqueous sulfuric acid mother liquor and reconstituting the diluted mother liquor to substantially water free sulfuric acid.

3. A process for recovering nicotinic acid bisulfate from mixtures thereof with concentrated sulfuric acid having concentrations in excess of 55% based on the weight of water and free sulfuric acid in the mixture, which comprises diluting the mixture, containing a quantity of nicotinic acid in excess of that required to provide a saturated solution thereof at the eventual temperature after dilution, with a controlled limited quantity of water sufficient to reduce the sulfuric acid concentration to not less than about 55% of free sulfuric acid, based on the total quantity of water and free sulfuric acid in the resulting mixture, followed by cooling to a temperature not greater than about 25° C., whereby nicotinic acid bisulfate is precipitated from solution, and thereafter separating the precipitated nicotinic acid bisulfate from the aqueous sulfuric acid mother liquor.

4. A process for recovering nicotinic acid bisulfate from mixtures thereof with concentrated sulfuric acid having concentrations in excess of 55% based on the weight of water and free sulfuric acid in the mixture, which comprises diluting the mixture, containing a quantity of nicotinic acid in excess of that required to provide a saturated solution thereof at the eventual temperature after dilution, with a controlled limited quantity of water sufficient to reduce the sulfuric acid concentration to not less than about 55% of free sulfuric acid based on the total quantity of water and free sulfuric acid in the resulting mixture, followed by cooling to a temperature not greater than about 25° C., whereby nicotinic acid bisulfate is precipitated from solution, and thereafter separating the precipitated nicotinic acid bisulfate from the aqueous sulfuric acid mother liquor and reconstituting the diluted mother liquor to substantially water-free sulfuric acid.

5. A process for recovering nicotinic acid bisulfate from mixtures thereof with sulfuric acid having concentrations in excess of 55% based on the weight of water and free sulfuric acid in the mixture, said mixture resulting from the oxidation in a sulfuric acid containing oxidizing medium of an N-heteroaryl compound containing a single pyridine nucleus, having an oxidizable organic hydrocarbon grouping attached to the pyridine nucleus in a single beta position, and having not more than two additional oxidizable hydrocarbon substituents attached to the pyridine nucleus, each of which is in an alpha position, which comprises diluting the mixture, containing a quantity of nicotinic acid in excess of that required to provide a saturated solution thereof at the eventual temperature after dilution, with a controlled limited quantity of water sufficient to reduce the sulfuric acid concentration to not less than about 55% of free sulfuric acid based on the total quantity of water and free sulfuric acid in the resulting mixture, followed by cooling to a temperature not greater than about 25° C. whereby nicotinic acid bisulfate is precipitated from solution, and thereafter separating the precipitated nicotinic acid bisulfate from the aqueous sulfuric acid mother liquor and reconstituting the diluted mother liquor to substantially water-free sulfuric acid.

6. A process for recovering nicotinic acid bisulfate from mixtures thereof with concentrated sulfuric acid having concentrations in excess of 55% based on the weight of water and free sulfuric acid in the mixture, said mixture resulting from the oxidation, in a sulfuric acid-containing oxidizing medium, of nitroquinoline, which comprises diluting the mixture, containing a quantity of nicotinic acid in excess of that required to provide a saturated solution thereof at the eventual temperature after dilution, with a controlled limited quantity of water sufficient to reduce the sulfuric acid concentration to not less than about 55% of free sulfuric acid based on the total quantity of water and free sulfuric acid in the resulting mixture, followed by cooling to a temperature not greater than about 25° C., whereby nicotinic acid bisulfate is precipitated from solution, and thereafter separating the precipitated nicotinic acid bisulfate from the aqueous sulfuric acid mother liquor and reconstituting the diluted mother liquor to substantially water-free sulfuric acid.

7. A process for recovering nicotinic acid bisulfate from mixtures thereof with concentrated sulfuric acid having concentrations in excess of 75% based on the weight of water and free sulfuric acid in the mixture, which comprises diluting the mixture, containing a quantity of nicotinic acid in excess of that required to provide a saturated solution thereof at the eventual temperature after dilution, with a quantity of water sufficient to bring the sulfuric acid concentration to within a range between about 75% and about 55% of free sulfuric acid based on the total quantity of water and free sulfuric acid in the resulting mixture, cooling the diluted mixture to a temperature between about minus 20° C. and about plus 25° C., whereby nicotinic acid bisulfate is precipitated, and separating the precipitated nicotinic acid bisulfate from the aqueous sulfuric acid mother liquor.

8. A process for recovering nicotinic acid bisulfate from mixtures thereof with concentrated sulfuric acid, said mixtures containing at least about 10% nicotinic acid in sulfuric acid of at least about 95% concentration, which comprises diluting the mixture with a controlled limited quantity of water sufficient to reduce the sulfuric acid concentration to not less than about 55% of free sulfuric acid based on the total quantity of water and free sulfuric acid in the resulting mixture, followed by cooling to a temperature not greater than about 25° C., whereby nicotinic acid bisulfate is precipitated from solution, and thereafter separating the precipitated nicotinic acid bisulfate from the aqueous sulfuric acid mother liquor.

9. A process for recovering nicotinic acid bisulfate from mixtures thereof with concentrated sulfuric acid having concentrations in excess of 75% based on the weight of water and free sulfuric acid in the mixture, said mixtures containing at least about 10% nicotinic acid, which comprises diluting the mixture with a quantity of water sufficient to bring the sulfuric acid concentration to within the range between about 75% and about 55% of free sulfuric acid based on the total quantity of water and free sulfuric acid in the resulting mixture, cooling the diluted mixture to a temperature within the range between about minus 20° C. and about plus 25° C. which is below that required to provide a saturated nicotinic acid solution after such dilution and cooling, whereby nicotinic acid bisulfate is precipitated, separating the precipitated nicotinic acid bisulfate from the aqueous sulfuric acid mother liquor, and adding to said mother liquor sufficient sulfuric anhydride to convert substantially all the water present in the mother liquor to sulfuric acid.

10. A process for recovering nicotinic acid bisulfate from mixtures thereof with concentrated sulfuric acid having concentrations in excess of 75% based on the weight of water and free sulfuric acid in the mixture, said mixtures containing at least about 10% nicotinic acid, which comprises diluting the mixture with a quantity of water sufficient to bring the sulfuric acid concentration to within the range between about 75% and about 55% of free sulfuric acid based on the total quantity of water and free sulfuric acid in the resulting mixture, cooling the diluted mixture to a temperature, within the range between about minus 20° C. and about plus 25° C., which is below that required to provide a saturated nicotinic acid solution after such dilution and cooling, whereby nicotinic acid bisulfate is precipitated, separating the precipitated nicotinic acid bisulfate from the aqueous sulfuric acid mother liquor, and evaporating sufficient water from the mother liquor to bring the sulfuric acid concentration to between about 75% and about 95%, and thereafter adding sufficient sulfuric anhydride thereto to convert substantially all the remaining water present to sulfuric acid.

11. A process for recovering nicotinic acid bisulfate from mixtures thereof with concentrated sulfuric acid resulting from the oxidation of nitroquinoline in a sulfuric acid-containing medium, said mixtures containing at least about 10% nicotinic acid in sulfuric acid of at least about 95% concentration, which comprises diluting the mixture with a quantity of water sufficient to bring the sulfuric acid concentration to within the range between about 75% and about 55% of free sulfuric acid based on the total quantity of water and free sulfuric acid in the resulting mixture, cooling the diluted mixture to a temperature, within the range between about minus 20° C. and about plus 25° C., which is below that required to provide a saturated nicotinic acid solution after such dilution and cooling, whereby nicotinic acid bisulfate is precipitated, separating the precipitated nicotinic acid bisulfate from the aqueous sulfuric acid mother liquor, reconstituting the aqueous mother liquor to substantially water-free concentrated sulfuric acid and recycling the reconstituted mother liquor to a subsequent nitroquinoline oxidation step.

12. The process according to claim 11, wherein the aqueous mother liquor is reconstituted by adding thereto sufficient sulfuric anhydride to convert substantially all the water in the mother liquor to sulfuric acid.

13. The process according to claim 11, wherein the aqueous mother liquor is reconstituted by evaporating sufficient water from the mother liquor to bring the sulfuric acid concentration to between about 75% and about 95% and thereafter adding sufficient sulfuric anhydride thereto to convert substantially all of the remaining water to sulfuric acid.

14. The method of recovering nicotinic acid bisulfate from a mixture thereof with sulfuric acid of substantially greater than 75% concentration containing more than about 18% nicotinic acid, which comprises diluting the mixture with water to a sulfuric acid concentration between about 75% and about 55% free sulfuric acid based on the total quantity of water and free sulfuric acid in the resulting mixture, and mechanically separating solids from the liquor at a temperature between about minus 20° C. and about plus 25° C., whereby nicotinic acid is recovered in the form of solid nicotinic acid bisulfate.

15. A process for recovering isonicotinic acid bisulfate from mixtures thereof with concentrated sulfuric acid having concentrations in excess of 75%, based on the weight of water and free sulfuric acid in the mixture, which comprises diluting the mixture, containing a quantity of isonicotinic acid in excess of that required to provide a saturated solution thereof at the eventual temperature after dilution, with a controlled limited quantity of water sufficient to reduce the sulfuric acid concentration to not less than about 55% of free sulfuric acid based on the total quantity of water and free sulfuric acid in the resulting mixture, cooling the diluted mixture to a temperature below about 25° C., whereby isonicotinic acid bisulfate is precipitated from solution, and thereafter separating the precipitated isonicotinic acid bisulfate from the aqueous sulfuric acid mother liquor.

16. A process for recovering isonicotinic acid bisulfate from mixtures thereof with concentrated sulfuric acid having concentrations in excess of 65% based on the weight of water and free sulfuric acid in the mixture, which comprises diluting the mixture, containing a quantity of isonicotinic acid in excess of that required to provide a saturated solution thereof at the eventual temperature after dilution, with a controlled limited quantity of water sufficient to reduce the sulfuric acid concentration to between about 65% and about 55% of free sulfuric acid based on the total quantity of water and free sulfuric acid in the resulting mixture, cooling the diluted mixture to a temperature between about minus 30° C. and about plus 25° C., whereby isonicotinic acid bisulfate is precipitated from solution, and thereafter separating the precipitated isonicotinic acid bisulfate from the aqueous sulfuric acid mother liquor.

17. A process for recovering cinchomeronic acid bisulfate from mixtures thereof with concentrated sulfuric acid having concentrations in excess of 65% based on the weight of water and free sulfuric acid in the mixture, which comprises diluting the mixture, containing a quantity of cinchomeronic acid in excess of that required to provide a saturated solution thereof at the eventual temperature after dilution, with a controlled limited quantity of water sufficient to reduce the sulfuric acid concentration to not less than about 65% of free sulfuric acid based on the total quantity of water and free sulfuric acid in the resulting mixture, cooling the diluted mixture to a temperature below about 25° C., whereby cinchomeronic acid bisulfate is precipitated from solution, and thereafter separating the precipitated cinchomeronic acid bisulfate from the aqueous sulfuric acid mother liquor.

18. A process for recovering cinchomeronic acid bisulfate from mixtures thereof with concentrated sulfuric acid having concentrations in excess of 75%, based on the weight of water and free sulfuric acid in the mixture, which comprises diluting the mixture, containing a quantity of cinchomeronic acid in excess of that required to provide a saturated solution thereof at the eventual temperature after dilution, with a controlled limited quantity of water sufficient to reduce the sulfuric acid concentration to between about 65% and about 75% of free sulfuric acid based on the total quantity of water and free sulfuric acid in the resulting mixture, cooling the diluted mixture to a temperature between about minus 25° C. and plus 25° C., whereby cinchomeronic acid bisulfate is precipitated from solution, and thereafter separating the precipitated cinchomeronic acid bisulfate from the aqueous sulfuric acid mother liquor.

References Cited in the file of this patent

UNITED STATES PATENTS

| | | |
|---|---|---|
| 2,109,954 | Biswell et al. | Mar. 1, 1938 |
| 2,436,660 | Mueller | Feb. 24, 1948 |
| 2,447,234 | Dean et al. | Aug. 17, 1948 |

OTHER REFERENCES

Woodward, et al.: "Industrial and Engineering Chem." (June 1944), vol. 36, No. 6, pp. 544–546.